May 7, 1940.  A. MAZZELLA  2,199,958
HOISTING SLING
Filed May 12, 1939  2 Sheets-Sheet 1
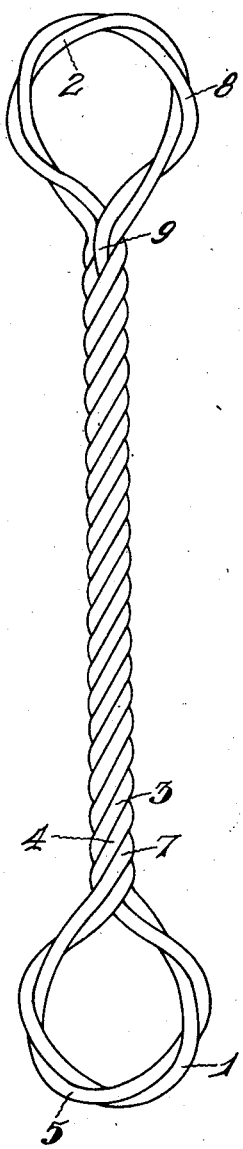
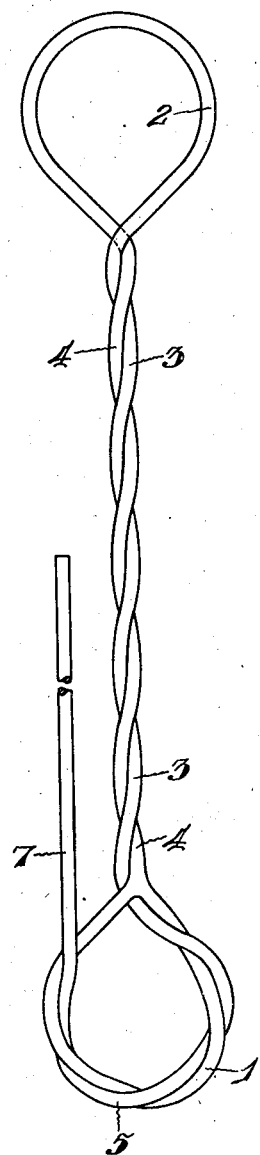
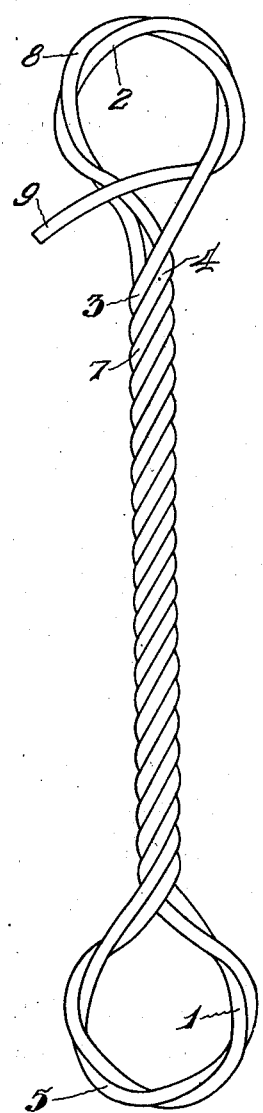
INVENTOR
Antonio Mazzella
BY Martin J. Maurion
ATTORNEY

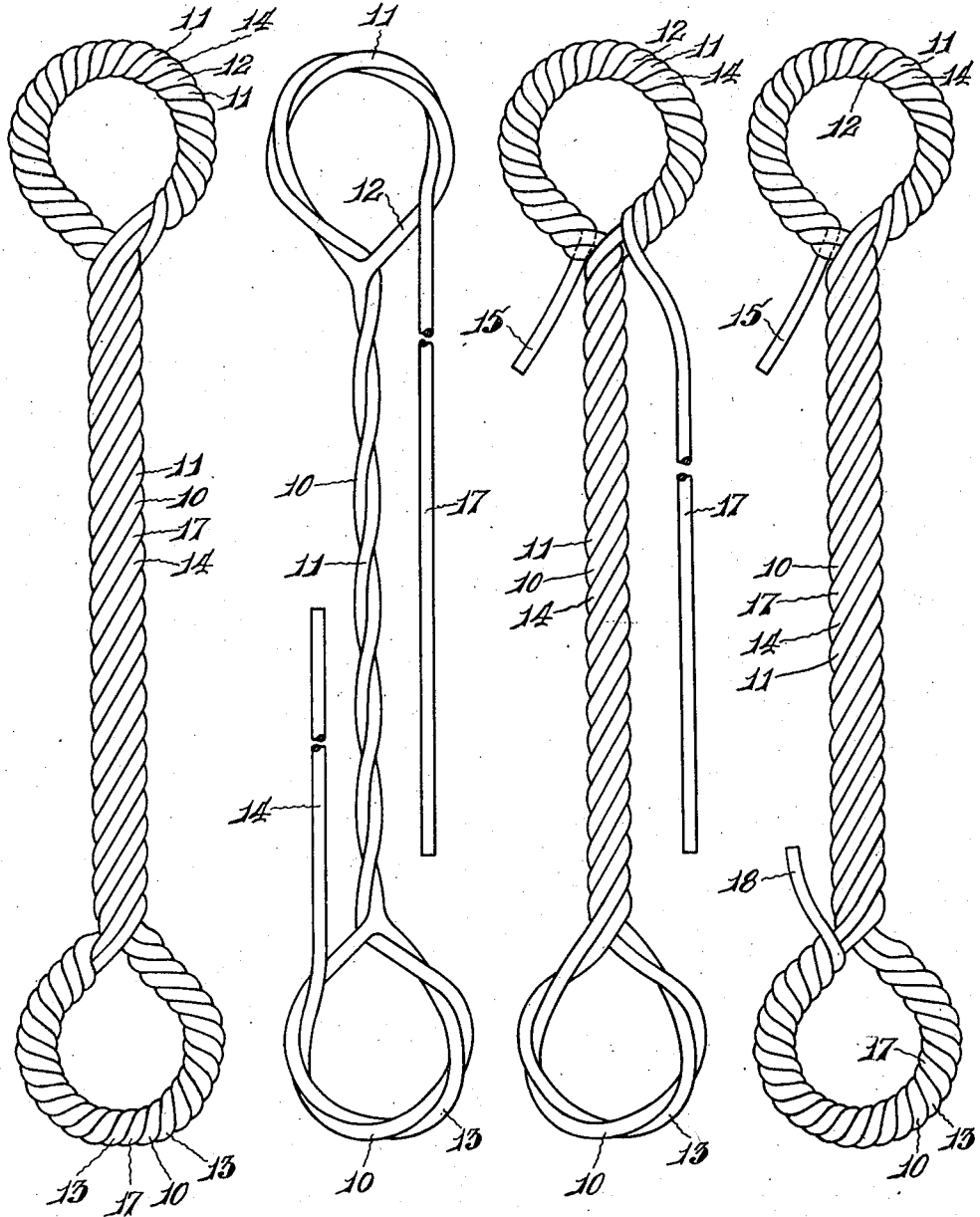

Patented May 7, 1940

2,199,958

UNITED STATES PATENT OFFICE 2,199,958

HOISTING SLING

Antonio Massella, Toronto, Ohio, assignor of one-half to P. J. Murray, Toronto, Ohio Application May 12, 1939, Serial No. 273,177

11 Claims. (Cl. 294—74)

This invention relates to hoisting slings made from wire rope, cable, or the like, and, additionally, relates to methods of producing the same.

One of the objects of the invention is to provide a sling having a great lifting capacity and tensile strength.

Another object is to provide a sling whose eyes are reinforced so that the tensile strength of the eyes compares favorably with the breaking strength of the body of the sling.

Another object is to provide a sling which is non-spinning, non-kinking, and which has unusual flexibility.

Another object of the invention is to provide a method of forming hoisting slings whereby any desired length of sling may be accurately gauged and produced.

Other objects and advantages not hereinbefore specifically pointed out will appear from the following detailed description and the accompanying drawings, in which—

Figure 1 is a plan view of a sling formed in accordance with the invention, the body of the sling consisting of three cables and the eyes consisting of two cables, one wrapped about the other;

Figure 2 is a plan view illustrating one of the stages in the formation of the completed sling depicted in Fig. 1;

Figure 3 is a plan view illustrating a later stage of the operation;

Figure 4 is a plan view of a sling wherein the body consists of four cables and the eyes consist of three cables; and—

Figures 5, 6 and 7 show progressive steps in the formation of the sling shown in Fig. 4.

Referring, first, to Figs. 1, 2 and 3 of the drawings, it will be noted that the sling is made from one continuous length of cable. While the sling may be formed from a single wire or a strand comprising a plurality of wires, it is preferred that a wire cable be used since cable adds strength and flexibility.

An eye 1 is formed or served in one of the ends of the length of cable, the free end of the cable being spliced in the cable after the formation of the eye, as ordinarily. The length of cable is then reversely turned at an appropriate distance from the eye 1 equivalent to the length of the sling to be made to form a loop or eye 2. The free portion 3 of the cable is then wrapped or twisted helically around that portion of the cable 4 between the opposite eyes 1 and 2 and in a direction toward the eye 1. Upon reaching the eye 1, the cable is then helically wrapped or entwined about the cable of the eye, as shown at 5, to reinforce the latter.

That portion 7 of the cable then remaining is then helically twisted or laid into the portions 3 and 4 in a direction toward the eye 2 to form the body of the sling. Upon reaching the eye 2, the cable is then helically wrapped or entwined about the cable of the eye 2, as shown at 8, to reinforce the latter. The free end 9 of the cable is then spliced into the body of the sling to complete the formation.

The sling illustrated in Figs. 4 to 7 of the drawings is made from two lengths of cable. Each length of cable 10 and 11 has eyes 12 and 13, respectively, formed in one of its ends. The eyes 12 and 13 are spaced apart a distance corresponding to the length of the sling to be made. The lengths of cables 10 and 11 intermediate the two eyes are helically wrapped about each other, as shown in Fig. 5, and a portion of the cable 10 is wrapped or entwined about the eye 13, while a portion of the cable 11 is wrapped or entwined about the eye 12, as shown in Fig. 5 of the drawings.

That portion 14 of the cable 10 remaining free after wrapping about the eye 13 is then helically laid into the previously twisted lengths 10 and 11 of the sling body toward the eye 12, and, upon reaching said eye 12, it is closely wrapped about said eye, as shown in Fig. 6, after which its terminal end 15 is spliced in the body of the sling.

That portion 17 of the cable 11 remaining free after wrapping about the eye 12 is then helically laid into the previously twisted lengths 10, 11 and 14 of the sling body toward the eye 13, and, upon reaching said eye 13, it is closely wrapped about said eye, as shown in Fig. 7, after which its end 18 is spliced in the body of the sling to complete the formation.

While the eyes 1 and 2 of Figs. 1, 2 and 3 have been shown and described as entwined by the cables 5 and 8, the cables may be closely wrapped around the eyes as are the cables 14 and 17 of Figs. 4 to 7.

Particular attention is called to the fact that in helically wrapping the cable to produce slings according to the teachings of the present invention, the cable is preferably laid or wrapped throughout its entire extent in a direction opposite to the lay of the cable from which the sling is made.

What is claimed is—

1. The method of making hoisting slings which resides in initially forming an eye in one end of flexible cable, then reversely bending the cable upon itself at a spaced distance from said eye to form a second eye with a body portion of the cable between the eyes, then helically wrapping said cable along the body portion toward said first eye, then wrapping the same about said first eye and then about said body portion toward said second eye, and finally wrapping the same about said second eye.

2. The method of making hoisting slings which resides in initially forming an eye in one end of each of a pair of flexible cables that are in side-by-side engagement, and which constitute a body, the eyes at the ends of the body being spaced, then in wrapping each free end of each cable about the eye of the other cable, then in wrapping the ends about the body and then wrapping the ends of the cables about the eyes of their cables whereby the body is constituted of four cables and each eye of three cables.

3. The method of forming a hoisting sling, which consists in forming an eye in one end of a flexible cable, then in reversely bending the cable upon itself to form a bight portion spaced from the eye, then in twisting together the parallel cables between the eye and bight portion to form a body, then in twisting the free end of the cable through the eye and then again reversely about the body, then in twisting the free end through the bight portion to form a second eye, and finally in anchoring the free end to the sling.

4. The method of making hoisting slings in accordance with claim 1 wherein the cable in the formation of the sling is wrapped throughout its entire extent in a direction opposite to the lay of the cable from which the sling is being made.

5. The method of making hoisting slings which resides in initially forming an eye in one end of each of a pair of flexible cables that are in side-by-side relation, and which constitute a body, the eyes at the ends of the body being spaced and opposed to each other, then in helically wrapping each free end of each cable about each other toward the eye of the other cable, then in wrapping each free portion of each cable about the eye of the other cable, then in helically wrapping the free portion of each cable toward their respective eyes, and then wrapping each cable about its respective eye.

6. The method of making hoisting slings in accordance with claim 5 wherein each of the pair of cables in the formation of the sling is wrapped throughout in a direction opposite to the lay of the individual cables from which the sling is made.

7. A hoisting sling comprising a body portion with an eye at each end thereof, said body portion and said eyes being formed of helically wrapped cables, the number of strands forming said eye portions being greater than half the number of cables in the body portion, and certain of said cables in the eye portions having both ends continued through and helically wrapped with other cables of the body portion.

8. A sling comprising a wire cable having one end thereof reversely bent upon itself and secured to the body of the cable at a point spaced from the end to form an eye, said cable being also turned upon itself at a point spaced from said eye to form a second eye, and the free length of said cable being helically wound upon the length thereof between the eyes and upon that part of the cable forming the eyes to form a sling body with an eye at each end consisting of helically wound cables.

9. A sling comprising a wire cable having one end thereof reversely bent upon itself and secured to the body of the cable at a point spaced from the end to form an eye, said cable being also turned upon itself at a point spaced from said eye to form a second eye, and the free length of said cable being helically wound upon the length thereof between the eyes and upon that part of the cable forming the eyes to form a sling body with an eye at each end consisting of helically wound cables, and the number of cables in the eyes being greater than half the number of cables in the body portion.

10. A sling comprising a wire cable having one end thereof reversely bent upon itself and secured to the body of the cable at a point spaced from the end to form an eye, said cable being also turned upon itself at a point spaced from said eye to form a second eye, and the free length of said cable being helically wound upon the length thereof between the eyes and upon that part of the cable forming the eyes to form a sling body with an eye at each end consisting of helically wound cables, and the other end of the cable being spliced to the body thereof at a point adjacent the second eye after being wound about the material forming the eye.

11. A hoisting sling comprising a single length of wire cable wound upon itself to form an elongated body consisting of a plurality of helically laid cables with an eye at each end of the body, the eyes also consisting of a plurality of helically laid cables, and each of the ends of the cable being secured to an intermediate portion of the cable at the base of one of the eyes.

ANTONIO MAZZELLA.